US011093158B2

United States Patent
Natanzon et al.

(10) Patent No.: US 11,093,158 B2
(45) Date of Patent: Aug. 17, 2021

(54) SUB-LUN NON-DEDUPLICATED TIER IN A CAS STORAGE TO REDUCE MAPPING INFORMATION AND IMPROVE MEMORY EFFICIENCY

(71) Applicant: EMC IP Holding Company LLC, Hopkinton, MA (US)

(72) Inventors: Assaf Natanzon, Tel Aviv (IL); Zvi Schneider, Tel Aviv (IL); Amitai Alkalay, Kadima (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 51 days.

(21) Appl. No.: 16/261,174

(22) Filed: Jan. 29, 2019

(65) Prior Publication Data

US 2020/0241790 A1 Jul. 30, 2020

(51) Int. Cl.
  *G06F 3/06* (2006.01)
  *G06F 12/1018* (2016.01)
  *G06F 12/02* (2006.01)

(52) U.S. Cl.
  CPC .......... *G06F 3/0649* (2013.01); *G06F 3/0616* (2013.01); *G06F 3/0641* (2013.01); *G06F 3/0653* (2013.01); *G06F 3/0689* (2013.01); *G06F 12/1018* (2013.01)

(58) Field of Classification Search
  None
  See application file for complete search history.

(56) References Cited

U.S. PATENT DOCUMENTS

| | | | |
|---|---|---|---|
| 7,203,741 B2 | 4/2007 | Marco et al. | |
| 7,567,188 B1 * | 7/2009 | Anglin | G06F 3/0608 341/63 |
| 7,719,443 B1 | 5/2010 | Natanzon | |
| 7,840,536 B1 | 11/2010 | Ahal et al. | |
| 7,840,662 B1 | 11/2010 | Natanzon | |
| 7,844,856 B1 | 11/2010 | Ahal et al. | |
| 7,860,836 B1 | 12/2010 | Natanzon et al. | |
| 7,882,286 B1 | 2/2011 | Natanzon et al. | |
| 7,934,262 B1 | 4/2011 | Natanzon et al. | |

(Continued)

OTHER PUBLICATIONS

U.S. Appl. No. 14/496,783, filed Sep. 25, 2014, Natanzon et al.

(Continued)

*Primary Examiner* — Christopher D Birkhimer
(74) *Attorney, Agent, or Firm* — Daly, Crowley Mofford & Durkee, LLP

(57) ABSTRACT

A method is disclosed for storing data in a storage system, comprising: receiving a write request at the storage system; detecting whether the write request is associated with one of a deduplication tier or a non-deduplication tier of the storage system; when the write request is associated with the deduplication tier of the storage system, storing data associated with the write request in the first portion of the volume and updating a first mapping structure to map the first LBA to at least one first hash digest that is generated based on the data; and when the write request is associated with the non-deduplication tier of the storage system, storing data associated with the write request in the second portion of the volume and updating the first mapping structure to map the first LBA to a second hash digest that is generated based on a second LBA.

17 Claims, 12 Drawing Sheets

(56) References Cited

U.S. PATENT DOCUMENTS

| | | |
|---|---|---|
| 7,958,372 B1 | 6/2011 | Natanzon |
| 8,037,162 B2 | 10/2011 | Marco et al. |
| 8,041,940 B1 | 10/2011 | Natanzon et al. |
| 8,060,713 B1 | 11/2011 | Natanzon |
| 8,060,714 B1 | 11/2011 | Natanzon |
| 8,103,937 B1 | 1/2012 | Natanzon et al. |
| 8,108,634 B1 | 1/2012 | Natanzon et al. |
| 8,214,612 B1 | 7/2012 | Natanzon |
| 8,250,149 B2 | 8/2012 | Marco et al. |
| 8,271,441 B1 | 9/2012 | Natanzon et al. |
| 8,271,447 B1 | 9/2012 | Natanzon et al. |
| 8,332,687 B1 | 12/2012 | Natanzon et al. |
| 8,335,761 B1 | 12/2012 | Natanzon |
| 8,335,771 B1 | 12/2012 | Natanzon et al. |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,032 B2 * | 7/2013 | Anglin .................. G06F 3/0604 707/673 |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,639,899 B2 * | 1/2014 | Kawakami ............ G06F 3/0608 711/114 |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,788,466 B2 * | 7/2014 | Anglin .................. G06F 3/0608 707/692 |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |

(56) References Cited

U.S. PATENT DOCUMENTS

| | | |
|---|---|---|
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,594,822 B1 | 3/2017 | Natanzon et al. |
| 9,600,377 B1 | 3/2017 | Cohen et al. |
| 9,619,543 B1 | 4/2017 | Natanzon et al. |
| 9,632,881 B1 | 4/2017 | Natanzon |
| 9,665,305 B1 | 5/2017 | Natanzon et al. |
| 9,710,177 B1 | 7/2017 | Natanzon |
| 9,720,618 B1 | 8/2017 | Panidis et al. |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 9,875,042 B1 | 1/2018 | Natanzon et al. |
| 9,875,162 B1 | 1/2018 | Panidis et al. |
| 9,880,777 B1 | 1/2018 | Bono et al. |
| 9,881,014 B1 | 1/2018 | Bono et al. |
| 9,910,620 B1 | 3/2018 | Veprinsky et al. |
| 9,910,621 B1 | 3/2018 | Golan et al. |
| 9,910,735 B1 | 3/2018 | Natanzon |
| 9,910,739 B1 | 3/2018 | Natanzon et al. |
| 9,917,854 B2 | 3/2018 | Natanzon et al. |
| 9,921,955 B1 | 3/2018 | Derbeko et al. |
| 9,933,957 B1 | 4/2018 | Cohen et al. |
| 9,934,302 B1 | 4/2018 | Cohen et al. |
| 9,940,205 B2 | 4/2018 | Natanzon |
| 9,940,460 B1 | 4/2018 | Derbeko et al. |
| 9,946,649 B1 | 4/2018 | Natanzon et al. |
| 9,959,061 B1 | 5/2018 | Natanzon et al. |
| 9,965,306 B1 | 5/2018 | Natanzon et al. |
| 9,990,256 B1 | 6/2018 | Natanzon |
| 9,996,539 B1 | 6/2018 | Natanzon |
| 10,001,942 B1* | 6/2018 | Sharma ............... G06F 3/0683 |
| 10,007,626 B1 | 6/2018 | Saad et al. |
| 10,019,194 B1 | 7/2018 | Baruch et al. |
| 10,025,931 B1 | 7/2018 | Natanzon et al. |
| 10,031,675 B1 | 7/2018 | Veprinsky et al. |
| 10,031,690 B1 | 7/2018 | Panidis et al. |
| 10,031,692 B2 | 7/2018 | Elron et al. |
| 10,031,703 B1 | 7/2018 | Natanzon et al. |
| 10,037,251 B1 | 7/2018 | Bono et al. |
| 10,042,579 B1 | 8/2018 | Natanzon |
| 10,042,751 B1 | 8/2018 | Veprinsky et al. |
| 10,055,146 B1 | 8/2018 | Natanzon et al. |
| 10,055,148 B1 | 8/2018 | Natanzon et al. |
| 10,061,666 B1 | 8/2018 | Natanzon et al. |
| 10,067,694 B1 | 9/2018 | Natanzon et al. |
| 10,067,837 B1 | 9/2018 | Natanzon et al. |
| 10,078,459 B1 | 9/2018 | Natanzon et al. |
| 10,082,980 B1 | 9/2018 | Cohen et al. |
| 10,083,093 B1 | 9/2018 | Natanzon et al. |
| 10,095,489 B1 | 10/2018 | Lieberman et al. |
| 10,101,943 B1 | 10/2018 | Ayzenberg et al. |
| 10,108,356 B1 | 10/2018 | Natanzon et al. |
| 10,108,507 B1 | 10/2018 | Natanzon |
| 10,108,645 B1 | 10/2018 | Bigman et al. |
| 10,114,581 B1 | 10/2018 | Natanzon et al. |
| 10,120,787 B1 | 11/2018 | Shemer et al. |
| 10,120,925 B1 | 11/2018 | Natanzon et al. |
| 10,126,946 B1 | 11/2018 | Natanzon et al. |
| 10,133,874 B1 | 11/2018 | Natanzon et al. |
| 10,140,039 B1 | 11/2018 | Baruch et al. |
| 10,146,436 B1 | 12/2018 | Natanzon et al. |
| 10,146,639 B1 | 12/2018 | Natanzon et al. |
| 10,146,675 B1 | 12/2018 | Shemer et al. |
| 10,146,961 B1 | 12/2018 | Baruch et al. |
| 10,148,751 B1 | 12/2018 | Natanzon |
| 10,152,246 B1 | 12/2018 | Lieberman et al. |
| 10,152,267 B1 | 12/2018 | Ayzenberg et al. |
| 10,152,384 B1 | 12/2018 | Amit et al. |
| 10,157,014 B1 | 12/2018 | Panidis et al. |
| 10,185,583 B1 | 1/2019 | Natanzon et al. |
| 10,191,677 B1 | 1/2019 | Natanzon et al. |
| 10,191,687 B1 | 1/2019 | Baruch et al. |
| 10,191,755 B1 | 1/2019 | Natanzon et al. |
| 10,203,904 B1 | 2/2019 | Natanzon et al. |
| 10,210,073 B1 | 2/2019 | Baruch et al. |
| 10,223,007 B1 | 3/2019 | Natanzon et al. |
| 10,223,023 B1 | 3/2019 | Natanzon et al. |
| 10,223,131 B1 | 3/2019 | Lieberman et al. |
| 10,229,006 B1 | 3/2019 | Natanzon et al. |
| 10,229,056 B1 | 3/2019 | Panidis et al. |
| 10,235,055 B1 | 3/2019 | Saad et al. |
| 10,235,060 B1 | 3/2019 | Baruch et al. |
| 10,235,061 B1 | 3/2019 | Natanzon et al. |
| 10,235,064 B1 | 3/2019 | Natanzon et al. |
| 10,235,087 B1 | 3/2019 | Baruch et al. |
| 10,235,088 B1 | 3/2019 | Baruch et al. |
| 10,235,090 B1 | 3/2019 | Baruch et al. |
| 10,235,091 B1 | 3/2019 | Ayzenberg et al. |
| 10,235,092 B1 | 3/2019 | Natanzon et al. |
| 10,235,145 B1 | 3/2019 | Natanzon et al. |
| 10,235,196 B1 | 3/2019 | Natanzon et al. |
| 10,235,247 B1 | 3/2019 | Natanzon et al. |
| 10,235,249 B1 | 3/2019 | Natanzon et al. |
| 10,235,252 B1 | 3/2019 | Lieberman et al. |
| 10,250,679 B1 | 4/2019 | Natanzon et al. |
| 10,255,137 B1 | 4/2019 | Panidis et al. |
| 10,255,291 B1 | 4/2019 | Natanzon et al. |
| 10,496,314 B2* | 12/2019 | Sharma ............... G06F 3/067 |
| 2010/0036887 A1* | 2/2010 | Anglin ............... G06F 3/067 707/812 |
| 2010/0082558 A1* | 4/2010 | Anglin ............ G06F 11/1453 707/694 |
| 2011/0131390 A1* | 6/2011 | Srinivasan ........... G06F 3/0641 711/209 |
| 2018/0173449 A1* | 6/2018 | Sharma ............... G06F 3/0641 |
| 2018/0181339 A1* | 6/2018 | Sharma ............... G06F 3/0685 |

OTHER PUBLICATIONS

U.S. Appl. No. 14/496,790, filed Sep. 25, 2014, Cohen et al.
U.S. Appl. No. 14/559,036, filed Dec. 3, 2014, Natanzon et al.
U.S. Appl. No. 14/753,389, filed Jun. 29, 2015, Nir et al.
U.S. Appl. No. 14/976,719, filed Dec. 21, 2015, Natanzon.
U.S. Appl. No. 14/978,378, filed Dec. 22, 2015, Bigman et al.
U.S. Appl. No. 15/085,148, filed Mar. 30, 2016, Baruch et al.
U.S. Appl. No. 15/274,362, filed Sep. 23, 2016, Baruch et al.
U.S. Appl. No. 15/275,768, filed Sep. 26, 2016, Natanzon et al.
U.S. Appl. No. 15/275,756, filed Sep. 26, 2016, Natanzon et al.
U.S. Appl. No. 15/379,940, filed Dec. 15, 2016, Baruch et al.
U.S. Appl. No. 15/386,754, filed Dec. 21, 2016, Shemer et al.
U.S. Appl. No. 15/380,013, filed Dec. 15, 2016, Baruch et al.
U.S. Appl. No. 15/390,996, filed Dec. 27, 2016, Natanzon et al.
U.S. Appl. No. 15/391,030, filed Dec. 27, 2016, Shemer et al.
U.S. Appl. No. 15/970,243, filed Sep. 3, 2018, Schneider et al.
U.S. Appl. No. 16/052,037, filed Aug. 1, 2018, Schneider et al.
U.S. Appl. No. 16/048,763, filed Jul. 30, 2018, Schneider et al.
U.S. Appl. No. 16/050,400, filed Jul. 31, 2018, Alkalay et al.
U.S. Appl. No. 16/179,295, filed Nov. 2, 2018, Natanzon et al.
U.S. Appl. No. 16/261,174, filed Jan. 29, 2019, Natanzon et al.
U.S. Appl. No. 16/368,008, filed Mar. 28, 2019, Natanzon et al.

* cited by examiner

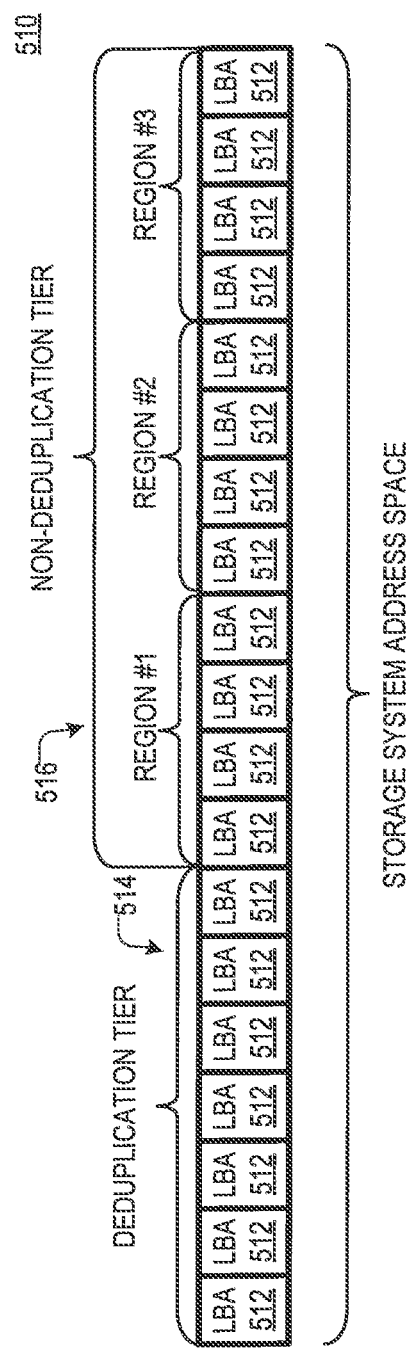
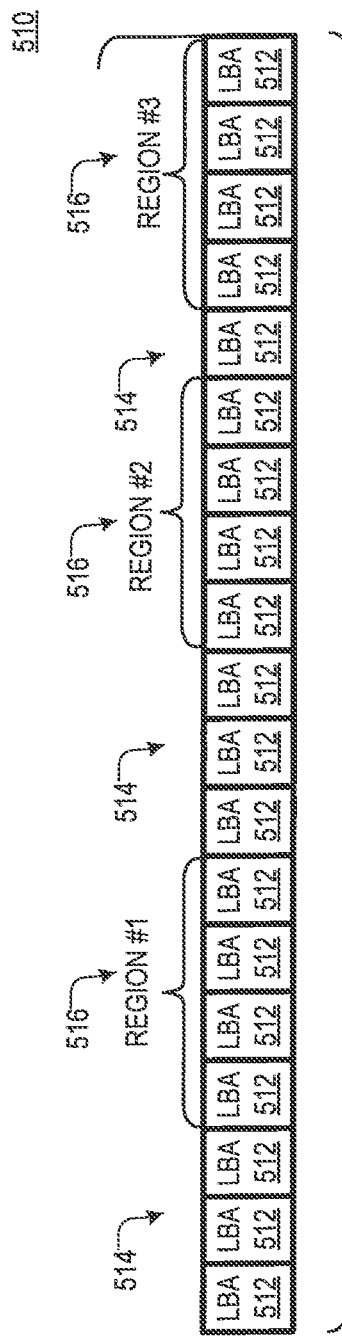
FIG. 5A
FIG. 5B

| 562 ↓ | 540 ↘ | 460 |
|---|---|---|
| LBA_1  558 | DATA_HASH_1  538a | |
| LBA_2  558 | DATA_HASH_2  538a | |
| LBA_3  558 | DATA_HASH_3  538a | |
| LBA_4  558 | DATA_HASH_4  538a | |
| LBA_5  558 | DATA_HASH_5  538a | |
| LBA_6  558 | LBA_HASH_1  538b | |
| LBA_7  558 | DATA_HASH_6  538a | |
| LBA_8  558 | LBA_HASH_2  538b | |

FIG. 5E

| | | 560 |
|---|---|---|
| HISTORY_VECTOR_1  564 | GROUP_ID_1  566 | |
| HISTORY_VECTOR_2  564 | GROUP_ID_2  566 | |
| HISTORY_VECTOR_3  564 | GROUP_ID_3  566 | |
| HISTORY_VECTOR_4  564 | GROUP_ID_4  566 | |
| HISTORY_VECTOR_5  564 | GROUP_ID_5  566 | |
| HISTORY_VECTOR_6  564 | GROUP_ID_6  566 | |

FIG. 5F

| 572 | 574a | 574b | 574c | 574d | 574e | 574f |
|---|---|---|---|---|---|---|
| CDR | PDR_1 | PDR_2 | PDR_3 | PDR_4 | PDR_5 | PDR_6 |

| ACTIVITY_INDICATOR_1 584 | REGION_ID_1 586 |
| ACTIVITY_INDICATOR_2 584 | REGION_ID_2 586 |
| ACTIVITY_INDICATOR_3 584 | REGION_ID_3 586 |
| ACTIVITY_INDICATOR_4 584 | REGION_ID_4 586 |
| ACTIVITY_INDICATOR_5 584 | REGION_ID_5 586 |
| ACTIVITY_INDICATOR_6 584 | REGION_ID_6 586 |

SUB-LUN NON-DEDUPLICATED TIER IN A CAS STORAGE TO REDUCE MAPPING INFORMATION AND IMPROVE MEMORY EFFICIENCY

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

According to aspects of the disclosure, a method is provided for storing data in a storage system, comprising: receiving a write request at the storage system, the write request being associated with a first LBA; detecting whether the write request is associated with one of a deduplication tier or a non-deduplication tier of the storage system, the deduplication tier of the storage system including a first portion of a volume in the storage system, and the non-deduplication tier including a second portion of the volume; when the write request is associated with the deduplication tier of the storage system, storing data associated with the write request in the first portion of the volume and updating a first mapping structure to map the first LBA to at least one first hash digest that is generated based on the data; and when the write request is associated with the non-deduplication tier of the storage system, storing data associated with the write request in the second portion of the volume and updating the first mapping structure to map the first LBA to a second hash digest that is generated based on a second LBA, the second LBA identifying a first region in the second portion of the storage system where the data is stored.

According to aspects of the disclosure, a system is provided, comprising: a memory; and one or more processors operatively coupled to the memory, the one or more processors being configured to perform the operations of: receiving a write request at the storage system, the write request being associated with a first LBA; detecting whether the write request is associated with one of a deduplication tier or a non-deduplication tier of the storage system, the deduplication tier of the storage system including a first portion of a volume in the storage system, and the non-deduplication tier including a second portion of the volume; when the write request is associated with the deduplication tier of the storage system, storing data associated with the write request in the first portion of the volume and updating a first mapping structure to map the first LBA to at least one first hash digest that is generated based on the data; and when the write request is associated with the non-deduplication tier of the storage system, storing data associated with the write request in the second portion of the volume and updating the first mapping structure to map the first LBA to a second hash digest that is generated based on a second LBA, the second LBA identifying a first region in the second portion of the storage system where the data is stored.

According to aspects of the disclosure, a non-transitory computer-readable medium configured to store one or more processor-executable instructions, which when executed by one or more processors, cause the processors to perform the operations of: receiving a write request at the storage system, the write request being associated with a first LBA; detecting whether the write request is associated with one of a deduplication tier or a non-deduplication tier of the storage system, the deduplication tier of the storage system including a first portion of a volume in the storage system, and the non-deduplication tier including a second portion of the volume; when the write request is associated with the deduplication tier of the storage system, storing data associated with the write request in the first portion of the volume and updating a first mapping structure to map the first LBA to at least one first hash digest that is generated based on the data; and when the write request is associated with the non-deduplication tier of the storage system, storing data associated with the write request in the second portion of the volume and updating the first mapping structure to map the first LBA to a second hash digest that is generated based on a second LBA, the second LBA identifying a first region in the second portion of the storage system where the data is stored.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 5A is a diagram of a storage system address space that is implemented using the storage array of FIG. 2, according to aspects of the disclosure;

FIG. 5B is a diagram, of another storage system address space that is implemented using the storage array of FIG. 2, according to aspects of the disclosure;

FIG. 5E is a diagram of an example of an address-to-hash (A2H) structure, according to aspects of the disclosure;

FIG. 5F is a diagram of an example of a history data structure, according to aspects of the disclosure;

FIG. 5G is a diagram of a history vector, according to aspects of the disclosure;

FIG. 5H is a diagram of an example of another history data structure, according to aspects of the disclosure;

DETAILED DESCRIPTION

Figure 1:
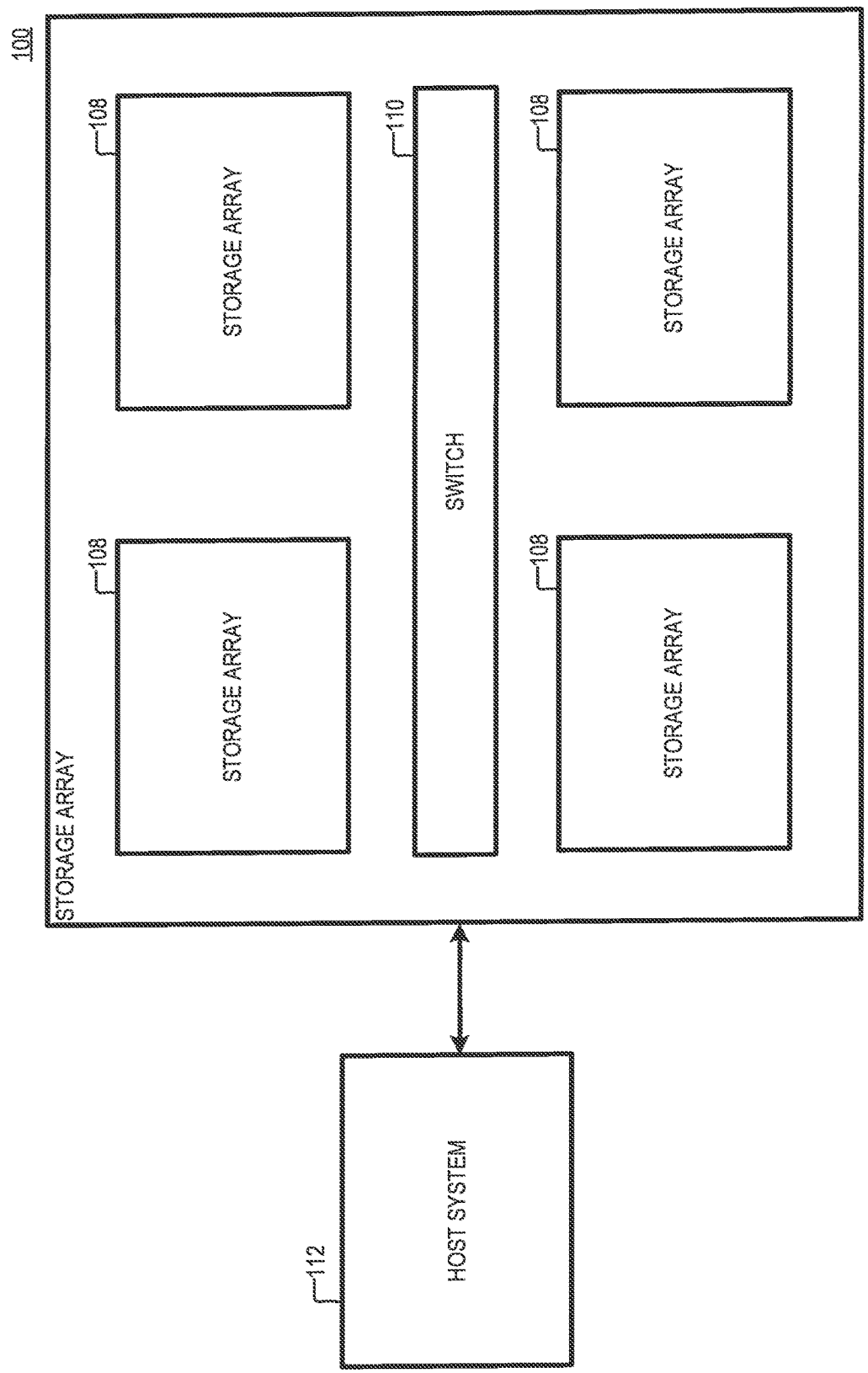
FIG. 1 is a diagram of an example of a distributed storage system, according to aspects of the disclosure.

FIG. 1 is a diagram of an example of a storage system 100, according to aspects of the disclosure. As illustrated, the storage system 100 may include one or more storage arrays 108 coupled to one another via network switch 110. The storage system 100 may include a content-based storage system and/or any other suitable type of distributed storage system. In operation, the storage system 100 may receive I/O requests from a host system 112, and it may fulfill these requests. Specifically, the storage system 100 may fulfill write requests by storing data associated with the write requests in one or more storage devices (e.g., Solid-State Drives (SSDs)) that are part of the storage system; and similarly, the storage system 100 may fulfill read requests by retrieving data that is stored in the one or more storage devices and providing the retrieved data to the host system 112. The manner in which read and write requests are fulfilled by the storage system 100 is discussed further below with respect to FIGS. 2-8.

Figure 2:
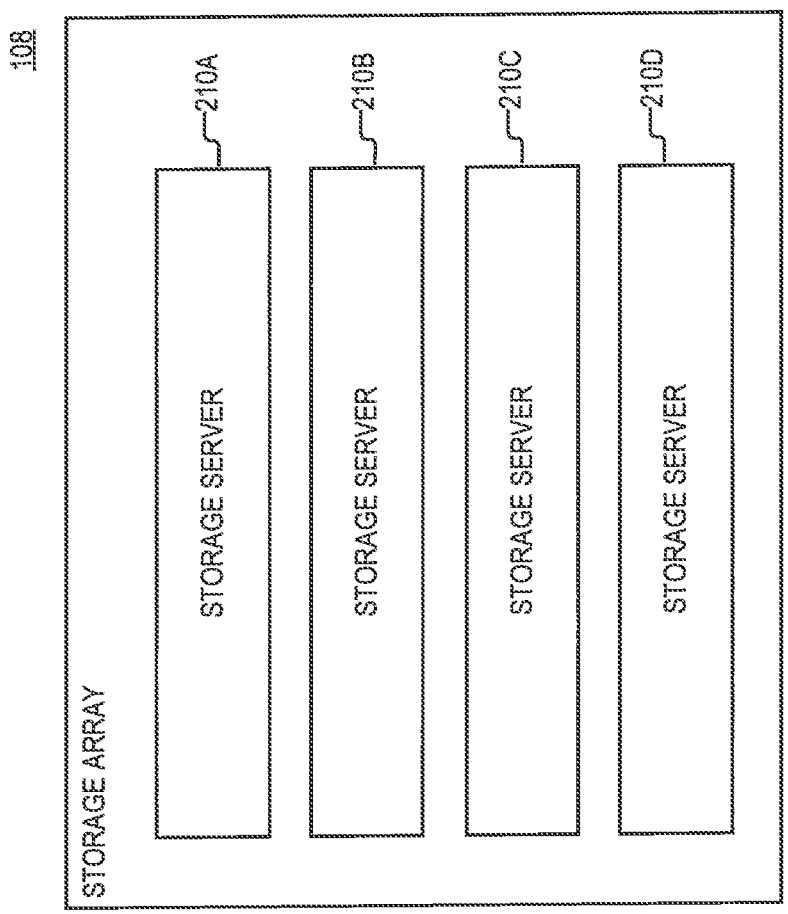
FIG. 2 is a diagram of an example of a storage system that is part of the distributed storage system of FIG. 1, according to aspects of the disclosure.

FIG. 2 is a diagram of a storage array 108 that is part of the storage system 100, according to aspects of the disclosure. The storage array 108 may include a plurality of storage servers 210 that are coupled to one another in a network (e.g., a mesh network). The network may include an InfiniBand network, a TCP/IP network, and/or any other suitable type of network. As is discussed further below, each of the storage servers 210 may be configured to execute one or more I/O providers. Each provider may include one or more service processes for processing incoming I/O requests.

Figure 3:
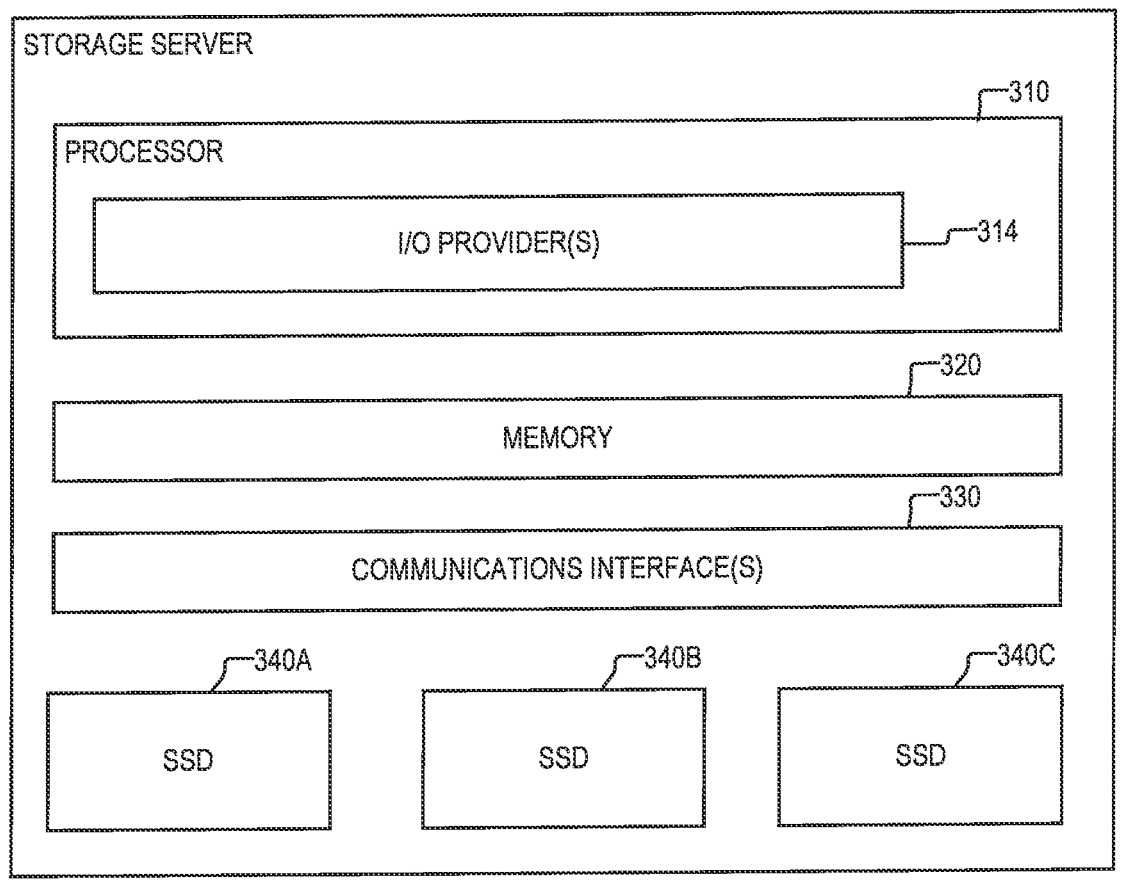
FIG. 3 is a diagram of an example of a storage server that is part of the source side storage system of FIG. 2, according to aspects of the disclosure.

FIG. 3 is a diagram of an example of a storage server 210, which as the numbering suggests, is representative of any of the storage servers 210A-D in the storage array 108. As illustrated, the storage server 210 may include a processor 310, a memory 320, a communications interface(s) 330, and a plurality of storage devices 340 that are operatively coupled to one another. The processor 310 may include any of one or more general-purpose processors (e.g., x86 processors, RISC processors, ARM-based processors, etc.), one or more Field Programmable Gate Arrays (FPGAs), one or more application specific circuits (ASICs), and/or any other suitable type of processing circuitry. The memory 320 may include any suitable, type of volatile and/or non-volatile memory. In some implementations, the memory 320 may include one or more of a random-access memory (RAM), a dynamic random memory (DRAM), a flash memory, a hard drive (HD), a solid-state drive (SSD), a network accessible storage (NAS), and or any other suitable type of memory device. The communications interface(s) 330 may include any suitable type of communications interface, such as one or more Ethernet adapters, one or more Wi-Fi adapters (e.g., 802.1414 adapters), and one or more Long-Term Evolution (LTE) adapters, for example. The storage devices 340 may be configured to form at least a portion of the storage array 108. In the present example, the storage devices 340 are solid state drives (SSD). However, alternative implementations are possible, in which at least one of the storage devices is a spinning hard disk (HD), a flash driver, a Read-Only Memory (ROM), a Random-Access Memory (RAM), and/or any other suitable type of volatile and non-volatile memory.

According to the present example, the processor 310 may be configured to execute at least I/O provider(s) 314. The I/O provider(s) 314 may include one or more processes for executing incoming I/O requests (e.g., write requests). Although in the present example, the I/O provider 314 is implemented in software, alternative implementations are possible in which the I/O provider 314 is implemented in hardware or as a combination of hardware and software. Stated succinctly, the present disclosure is not limited to any specific implementation of the I/O provider. As used throughout the disclosure, the term "I/O provider" may refer to any process which, alone or in combination with other processes, is configured to execute I/O requests that are received at the storage system 100, such as write requests for example.

Figure 4:
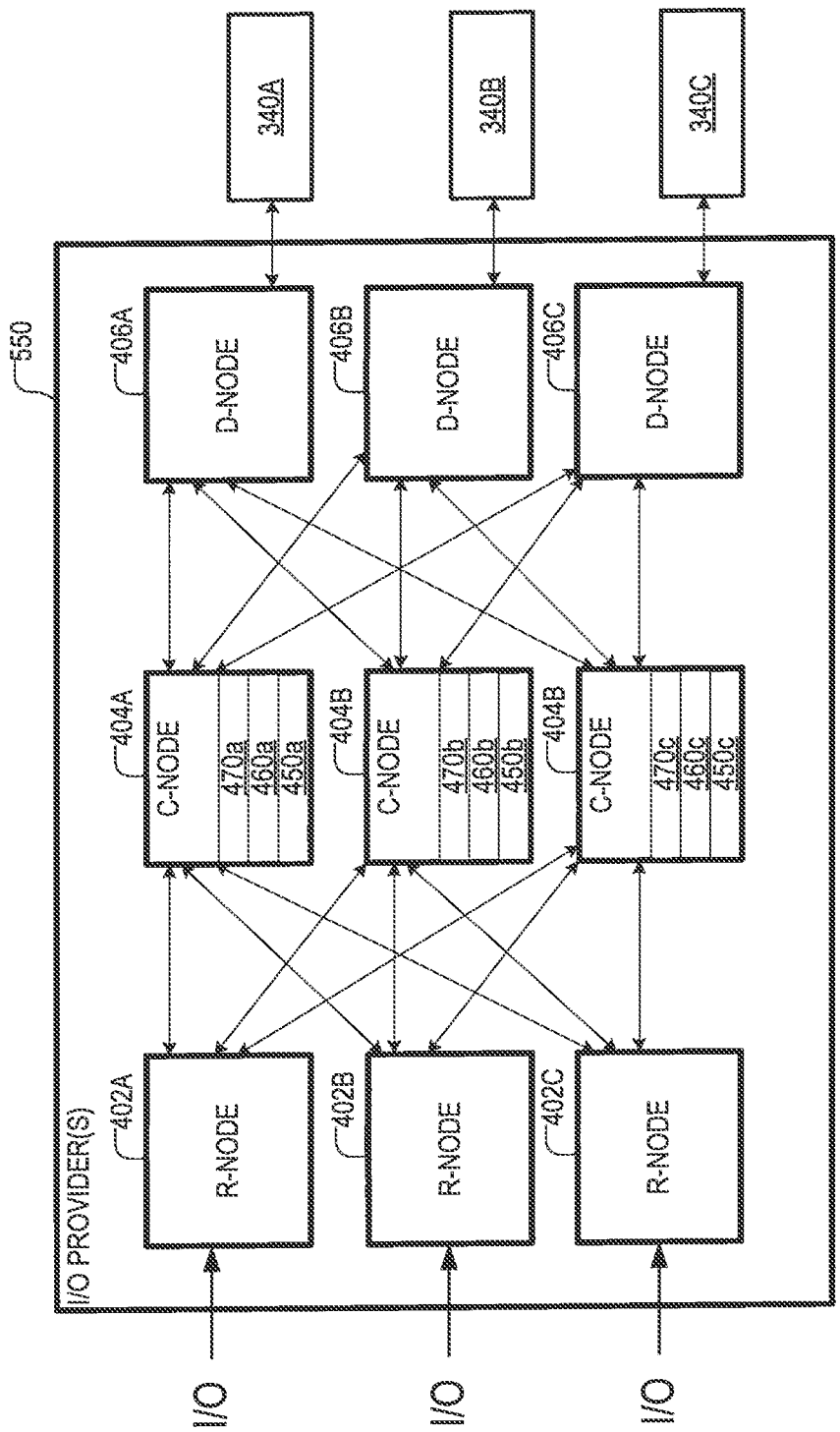
FIG. 4 is a diagram of an example of a disk I/O provider that is executed by the storage server of FIG. 3, according to aspects of the disclosure.

FIG. 4 is a diagram illustrating an example of one implementation of the I/O provider 314. According to the present example, the I/O provider 314 includes I/O providers 402, 404, and 406, which are herein referred to as routing nodes (R-nodes), control nodes (C-nodes), and data nodes (D-nodes) respectively. The R-nodes, the C-nodes, and the D-nodes are connected to one another in a mesh network (e.g., an InfiniBand network). According to the present example, the R-nodes, the C-nodes, and the D-nodes are part of the same I/O provider, and as such they are executed on the same storage server. However, it will be understood that alternative implementations are possible in which at least some of the R-nodes, the C-nodes, and the D-nodes are executed on different storage servers and/or are part of different I/O providers.

The R-nodes 402 may be configured to terminate I/O requests received at the storage system 100 and route them to appropriate C-nodes 404 and D-nodes 406 for further execution. In doing so, the R-nodes 402 may distribute a workload over multiple C-nodes 404 and D-nodes 406. In some implementations, any of the R-nodes 402 may be configured to write I/O requests (e.g., SCSI I/O requests) to selected ones of the C-nodes 404 for further processing.

The C-nodes 404 may be configured to control the execution of C-node commands supplied by the R-nodes 402. The C-node commands may be used to implement read requests, write requests, and/or any other suitable type of I/O request. In addition, each of the C-nodes 404 may maintain and manage key metadata elements. Each of the C-nodes 404 may be configured to receive C-node commands from the R-nodes and communicate with the D-nodes 406 to execute the commands. In some implementations, each C-node 404 may maintain, an address-to-hash (A2H) structure 460 and a hash-to-D-node (H2D) structure 450. An example of one possible implementation of the H2D structure 450 and the A2H structure 460 is discussed further below with respect to FIGS. 5A-G.

The D-nodes 406 may be configured to control the execution of D-node commands supplied by the C-nodes 404. Each of the D-nodes 406 may be attached to one or more of the storage devices 340. Each of the D-nodes 406 may be configured to map hash digests received from the C-nodes (in provided C-node commands) to different physical locations in the volumes 160 managed by the D-nodes 406

According to the present example, the R-nodes 402, the C-nodes 404, and the D-nodes 406 are arranged to implement a two-tier address space having a first portion that is deduplicated (hereinafter "deduplication tier") and a second portion that is non-deduplicated (hereinafter "non-deduplication tier"). In the deduplication tier, data is stored using content-based addressing. On the other hand, in the non-deduplicated tier, data is stored using location-based addressing. When content-based addressing is used to store data, the physical location on the physical medium where the data is stored is selected, at least in part, based on the content of data. On the other hand, when location-based addressing is used, the physical location where the data is stored is selected based on a provided LBA, rather than on the data's contents.

In operation, any of the R-nodes 402 may receive an I/O request that spans a range of logical data addresses (LDAs) from a multipath agent. The request may include a block of data and an opcode identifying an action that is required to be performed. In response to the request, the R-node 402 may use its respective A2C table to identify a plurality of C-nodes 404. Afterwards, the R-node 402 may decompose the I/O request into a plurality of C-node commands and forward the C-node commands to the identified C-nodes 404 for further processing.

In operation, any of the C-nodes 404 may receive a C-node command that is generated by one of the R-nodes 402. The C-node command may include a data payload and an opcode identifying an action that is required to be performed. Upon receiving the C-node command, the C-node 404 may determine whether the data associated with the C-node command needs to be stored in the deduplication tier of the storage system or the non-deduplication tier of the storage system by using the C-node's 404 respective A2H structure.

If the data is to be stored in the deduplication tier of the storage system 100, the data may be stored by using content-based addressing. To store the data using content-based addressing, the C-node 404 may generate one or more D-node commands (e.g., by executing a process that is the same or similar to the process 700A which is discussed with respect to FIG. 7A) and supply the generated D-node commands to corresponding D-nodes 406 for further processing. Otherwise, if the data is to be stored in the non-deduplication tier of the storage system, the data may be stored by using location-based addressing (e.g., by executing a process that is the same or similar to the process 700B which is discussed with respect to FIG. 7B).

In operation, any of the D-nodes 406 may receive a D-node command that is generated by one of the C-nodes 404. Next, the D-node 406 may identify a physical address in one of the storage devices 340 that corresponds to a hash digest that is contained in the D-node command. Afterwards, the D-node 406 may store the payload of the D-node command (i.e., the page of data contained in the D-node command) at the identified physical address.

FIG. 5A shows an example of the address space of a volume 510 in the storage system 100 that is implemented at least in part by using the R-nodes 402, C-nodes 404, and D-nodes 402. The address space may include a plurality of logical blocks 512, wherein each of the logical blocks 512 is identified using a corresponding logical block address (LBA). The address space may be divided into a deduplication tier 514 and a non-deduplication tier 516. Although in the present example each of the deduplication tier 514 and the non-deduplication tier 516 constitutes a contiguous segment of the address space of the volume 510, the present disclosure is not limited thereto. As illustrated in FIG. 5B, alternative implementations are possible in which any of the deduplication tier 514 and the non-deduplication tier 516 includes a non-contiguous segment of the address space of the volume 510. Furthermore, although in the present example each of the regions in the non-deduplication tier 516 is a contiguous segment of the address space of the volume 510, alternative implementations are possible in which any of the regions in the non-deduplication tier 516 includes a non-contiguous segment of the address space of the volume 510.

When a write request is received at the storage system, which identifies a logical block in the deduplication tier 514, data associated with the write request may be stored in the storage system 100 by using content-based addressing. On the other hand, when a write request is received that identifies a logical block in the non-deduplication tier 516, data associated with the write request may be stored in the storage system 100 by using location-based addressing. In some implementations, when the storage system 100 includes a RAID array, each of the regions in the non-deduplication tier 516 may be substantially the same size as a stripe in the array (e.g., a RAID6 stripe). Additionally or alternatively, in some implementations, the size of each region in the non-deduplication tier 516 may be in the range of 11-22 MB.

The two-tier arrangement of the volume 510 may allow the storage system to balance its use of random-access memory (RAM) against its use of permanent storage space. Data that is stored using content-based addressing is deduplicated, whereas data that is stored by using location-based addressing is not deduplicated. For each logical block (e.g., page) of the data that is stored using content-based addressing, the storage system is required to maintain a corresponding hash digest in its RAM. On the other hand, location-based storage of data, does not require the maintenance of hash digests in RAM. So, storing data using content-based addressing helps utilize permanent storage more efficiently, but it is more RAM-intensive in comparison to location-based addressing.

Figure 5C:
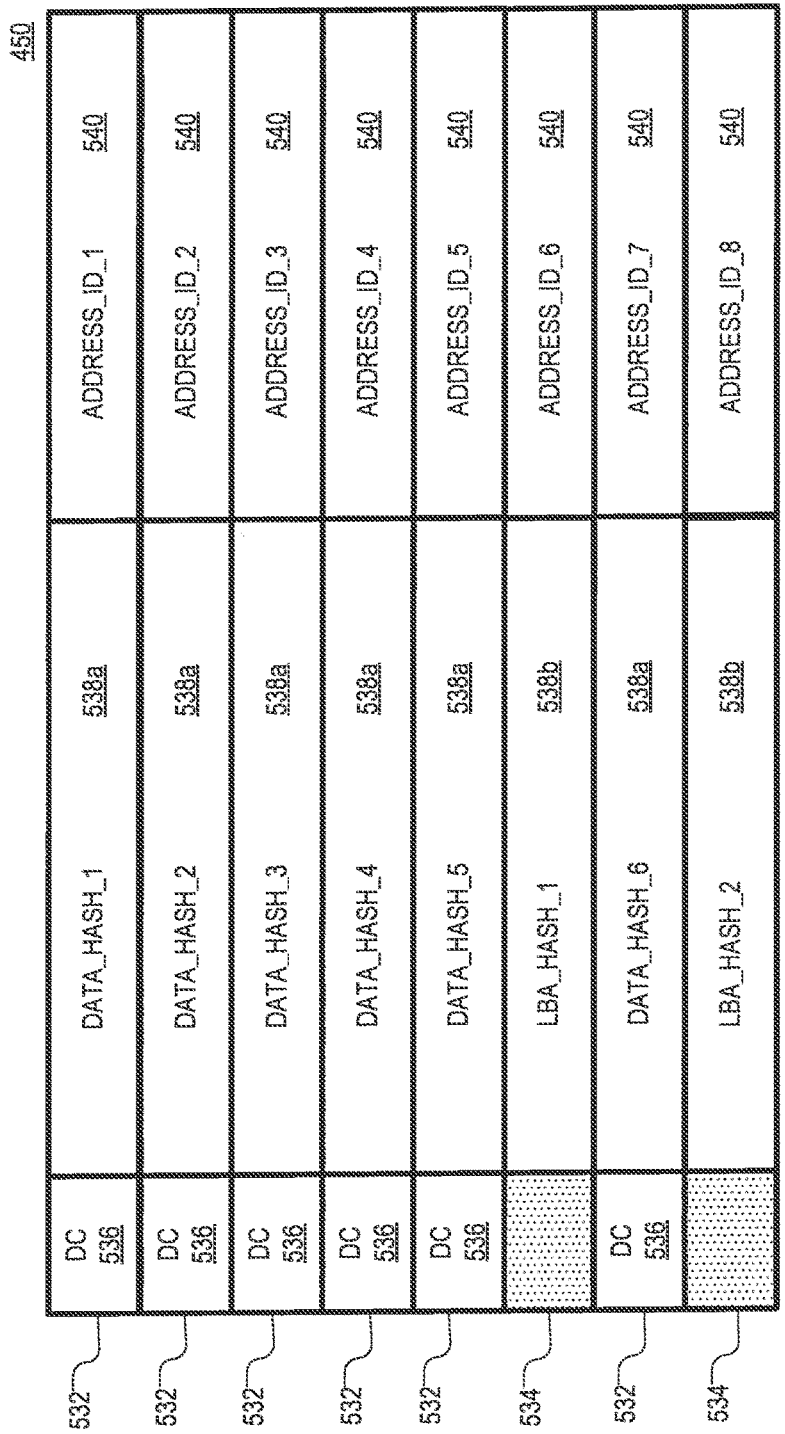
FIG. 5C is an example of a hash-to-data (H2D) structure, according to aspects of the disclosure.

FIG. 5C is a diagram of an example of the H2D structure 450 which, as the numbering suggests, is representative of the H2D structures 450a-c used by C-nodes 404. As illustrated, the H2D structure 450 may include a plurality of entries 532 and a plurality of entries 534. Each of the entries 532 may map a hash digest of a unit of data (e.g., a page or logical block, etc.) that is stored in the storage system 100 to the physical address in the storage system where the unit of data is stored. Each of the entries 534 may map a hash digest of an LBA corresponding to one of the regions in the non-deduplication tier 516 where data is stored to the physical location where one or more units of data are stored. In some implementations, the LBA of the region where the unit of data is stored may be the first LBA (e.g., smallest LBA) in the region. The offset, relative to the LBA of the region, where the unit of data is actually stored may be readily determined based on the LBA of the region and an LBA that is provided in a command to store/read data (e.g., an I/O request, a C-node command, etc.) Although the H2D structure 450 is depicted as a table, it will be understood that any suitable type of data structure may be used to implement the H2D structure 450.

Each of the entries 532 may include a deduplication counter 536 (e.g. a reference counter), a data hash digest 538a, and an address ID 540. The data hash digest 538a in any given entry 532 may be a hash digest of a unit of data (e.g., a page of data) that is stored in one of the logical blocks 512 of the deduplication tier 514. The address ID 540 in the given entry 532 may identify the physical address in the storage system 100 where the unit of data is stored. The physical address where the data is stored may be identified either directly or indirectly. For example, when the address ID 540 identifies a physical address directly, the address ID 540 may include a physical location identifier in one or more storage devices in the storage system 100. By contrast, when the address ID 540 identifies the physical address indirectly, the address ID 540 may include an identifier of a D-node 406 (or another type of node), that is part of an execution pipeline, and responsible for resolving the physical location where the data is stored. According to the present disclosure, the A2H and H2D structures are not limited to using any specific type of physical location identifier.

The deduplication counter 536 in any given entry 532 may indicate the extent to which the data corresponding to the given entry 532 has been deduplicated. In operation, when a command to store one or more units of data (e.g., a C-node command) is received (and/or generated) at one of the C-nodes 404 of the storage system 100, the C-node may determine whether any of the units of data has already been stored in the storage system 100 (e.g., by determining whether the hash digest of the unit of data is already present in the H2D structure 450). When the unit of data associated with the command is already present in the storage system, there is no need to store it again, and the deduplication counter 536 that is mapped to the hash digest of the data (e.g., by one of the entries 532) may be incremented to indicate that the data has been deduplicated one more time.

Each of the entries 534 may include an LBA hash digest 538b and an address ID 540. As noted above, the LBA hash digest 538b in a given entry 534 may include a hash digest of the first LBA in a region where one or more units of data are stored. The LBA may be associated with a write request received at the storage system and/or a command to store data (e.g., a C-node command) that is generated internally at the storage system 100 based on the write request. In some implementations, each entry 532 may correspond to only one unit of data (e.g., a page or logical block) that is stored in the storage system, and each entry 534 may correspond to multiple units of data (e.g., multiple pages or logical blocks).

Figure 5D:
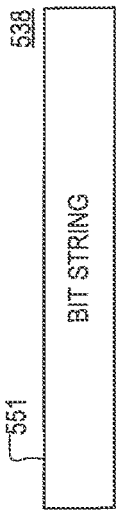
FIG. 5D is a diagram, of an example of a hash digest, according to aspects of the disclosure.

The data hash digests 538a and the LBA hash digests 538b may have the same format, in some implementations. Shown in FIG. 5D is a hash digest 538, which as the numbering suggests, is representative of the hash digests 538a and 538b. As illustrated, each of the hash digests 538a and 538b may include a bit string 550 that is at least one the same length and/or has been generated, at least in part, by using the same hashing function. Although not shown, in some implementations, the bit string 551 may include one or more bits that indicates whether the bit string 551 is a hash digest of an LBA or a unit of data.

FIG. 5E shows an example of an A2H structure 460, which as the numbering suggests, is representative of the A2H structures 460a-c used by the C-nodes 404. The A2H structure 460 may include a plurality of entries 552 and a plurality of entries 554. The entries 552 may correspond to data that is stored in the deduplication tier 514 of the storage system (e.g., by using content-based addressing). And the entries 554 may correspond to data that is stored in the non-deduplication tier 516. Each of the entries 552 may map an LBA where a unit of data (e.g., block) is stored to a hash digest 538a of the unit of data. Each of the entries 554 may map an LBA where the data is stored to a hash digest 538b of the LBA of the region in the non-deduplication tier where the data is stored. Although the A2H structure 460 is depicted as a table, it will be understood that any suitable type of data structure may be used to implement the A2H structure 460.

According to the example of FIGS. 5A-E, the two-tier address of the volume 510 is implemented by configuring the A2H structures 460 and the H2D structures 450 to carry two types of entries each. Implementing the two-tier address space in this manner is advantageous because it allows higher-level services, such as snapshot replication, to work without interruption and it does not require any major changes to the logical layer of the storage system 100 that implements the content-based addressing. As noted above, the A2H structures 460 may be configured to map: (i) LBAs where data is stored to hash digests of data, and (ii) the LBAs where data is stored to hash digests of the LBAs corresponding to the region in which the data is stored. The H2D structures 450 may be configured to map: (i) hash digests of data stored in the storage system to the physical locations where the data is stored, and (ii) hash digests of data stored in the storage system to hash digests of the LBAs corresponding to the regions where the data is stored. In some respects, configuring the A2H and H2D structures in this manner may permit the system to provide two-tier addressing, without necessitating changes to RAID and defragmentation logic that is used by the system. Although the A2H structure 460 and the H2D structure 450 are referred to as separate entities, it will be understood that in some implementations they can be integrated together, such that each of the A2H structure 460 and the H2D structure 450 is a different part of the same entity.

FIG. 5F shows an example of a history data structure 560 which corresponds to the deduplication tier 514 of the storage system 100. The data structure 560 may include a plurality of entries 562. Each entry 562 may map a history vector 564 to a group ID 566. Each group ID 566 may identify a group of logical blocks (e.g., pages) in the deduplication tier 514 whose combined size is the same as the regions in the non-deduplication tier 516 of the storage system 100. The history vector 564 in any given entry 562 may identify the degree to which the group of logical blocks (identified by the mapping's respective group ID 566) is deduplicated. As is further discussed below, the history vector for any group of logical blocks in the deduplication tier 514 of the storage system 100 may be used, at least in part, as a basis for determining whether to move the group of logical blocks from the deduplication tier 514 the non-deduplication tier 516 of the storage system 100. Although the history data structure 560 is depicted as a table, it will be understood that any suitable type of data structure may be used to implement the history data structure 560.

FIG. 5G shows an example of a history vector 564 for a group of logical blocks in the storage system 100. The history vector 564 may include an indication of a current deduplication ratio (CDR) 572 for the group of logical blocks. Furthermore, in some implementations, the history vector 564 may include one or more indications of past deduplication ratios (PDRs) 574 for the group of logical blocks. The CDR for the group of logical blocks may include any suitable measure of the degree to which data that is stored in the group of logical blocks is deduplicated during a current period (e.g., a period that is still running). Each of the PDRs for the group of logical blocks may include any suitable measure of the degree to which data that is stored in the group of logical blocks is deduplicated during a past period preceding the current period.

Each of the CDR and PDRs that are indicated by the history vector 564 may be generated based on the value of the deduplication counter 536 for at least one of the logical blocks (or pages) in the group of logical blocks. In this regard, in some implementations, to accumulate the indication of CDR and PDR in the history vector 564, the value of the deduplication counter for any of the logical blocks in the group may be reset to an initial value at the beginning of each period for which the CDR and PDRs are calculated. Each of the PDRs indicated by the history vector 564 may correspond to a different past period. In this regard, the PDRs, when viewed together, may describe a pattern (or trend) at which the deduplication ratio for the group of logical blocks has changed over time.

In some implementations, the CDR that is indicated by the history vector 564 may be calculated by: (i) obtaining the value of the deduplication counter of each logical block in the group for the current period, (ii) calculating the sum of all obtained deduplication counters, and (iii) dividing the sum by the total count of logical blocks (e.g., pages) in the group. Additionally or alternatively, in some implementations, the value of any of the PDRs that are indicated by the history vector 564 may be generated by: (i) obtaining the deduplication counter of each logical block (e.g. pages) in the group for the past period which corresponds to the PDR 574, (ii) calculating the sum of all obtained references counters, and (iii) and dividing the calculated sum by the total count of logical blocks (e.g., pages) in the group. Although in the present example, each of the CCDRs and the PDRs for a group of logical blocks is calculated by summing up the deduplication counters for the logical blocks (e.g., pages) in the group (for a particular period) and dividing the sum over the total count of logical blocks (e.g., pages) in the group, the present disclosure is not limited to any specific method for calculating the CCDRs and/or PDRs. Although in the present example, each history vector 564 indicates one or more PDRs 574 for the vector's corresponding group of logical blocks, alternative implementations are possible in which any of the history vectors 564 indicates only a CCDR for the group of logical blocks corresponding to the vector.

The history vector 564 may have any suitable format. For example, in some implementations, the history vector 564 may be 8 bits wide. In such implementations, the indication of CDR 572 may be 2-bits wide, and each indication of PDR 574 may be 1-bit wide. For instance: when the value of the CDR for the group of logical blocks is less than a first threshold (e.g., 1.1), the indication of CDR 572 may be assigned a first value (e.g., '00'); when the value of the CDR for the group of logical blocks is less than a second threshold (e.g., 1.5) but greater than the first threshold, the indication of CDR 572 may be assigned a second value (e.g., '01'); when the value of the CDR is less than a third threshold (e.g., 2) but greater than the second threshold, the indication of CDR 572 may be assigned a third value (e.g., '10'); and when the value of the CDR is greater than the third threshold, the indication of CDR may be given a fourth value (e.g., '11'). The indications of PDR 574 may be calculated in a similar manner: for instance, when the value of a PDR is less than a threshold (e.g., 1.1), the indication 574 of this PDR may be assigned a first value (e.g., '0'); and when the value of the PDR is greater than the threshold, the indication 574 of this PDR may be assigned a second value (e.g., '1'). Encoding the CDR and PDRs in this manner may reduce the overhead that is placed on the storage system 100 as a result of having to maintain history vectors 564 and the history data structure 560. More particularly, encoding the history vectors 564 in this manner may result in the history vectors 564 occupying about 5 MB of storage space per 1 PB of data that is stored in the storage system 100. Moreover, the inclusion of indications 574 of PDRs in the history vector 564 may permit the identification of increasing trends in the rate at which data is deduplicated, and distinguish such trends from short-lived fluctuations. Although in the present example the history vector 564 includes values that are generated by thresholding the CDR and PDRs, alternative implementations are possible in which the history vector includes the actual values of the CDR and PDRs. Stated succinctly, the present disclosure is not limited to any specific format of the history vector and/or any of the indications of the CDR and PDRs.

FIG. 5H shows an example of a history data structure 580 which corresponds to the non-deduplication tier of the storage system 100. The history data structure 580 may include a plurality of entries 582. Each entry 582 may include an activity indicator 584 and a region ID 586. Each region ID 586 may identify a different region in the non-deduplication tier of the storage system. The activity indicator 584 for any region may indicate one or more of a count of writes that are performed in the region, a count or reads that are performed in the region, and/or any other suitable type of metric that indicates the amount of activity that is taking place in the region. As is further discussed below, the activity vector 564 for any given region may be used, at least in part, as a basis for determining whether to move the region from the non-deduplication tier 516 of the storage system 100 to the deduplication tier 514 of the storage system 100. Although in the present example the data structures 560 and 580 are represented as separate entities, it will be understood that, in some implementations, the data structures 560 and 580 may be integrated together.

Figure 6:
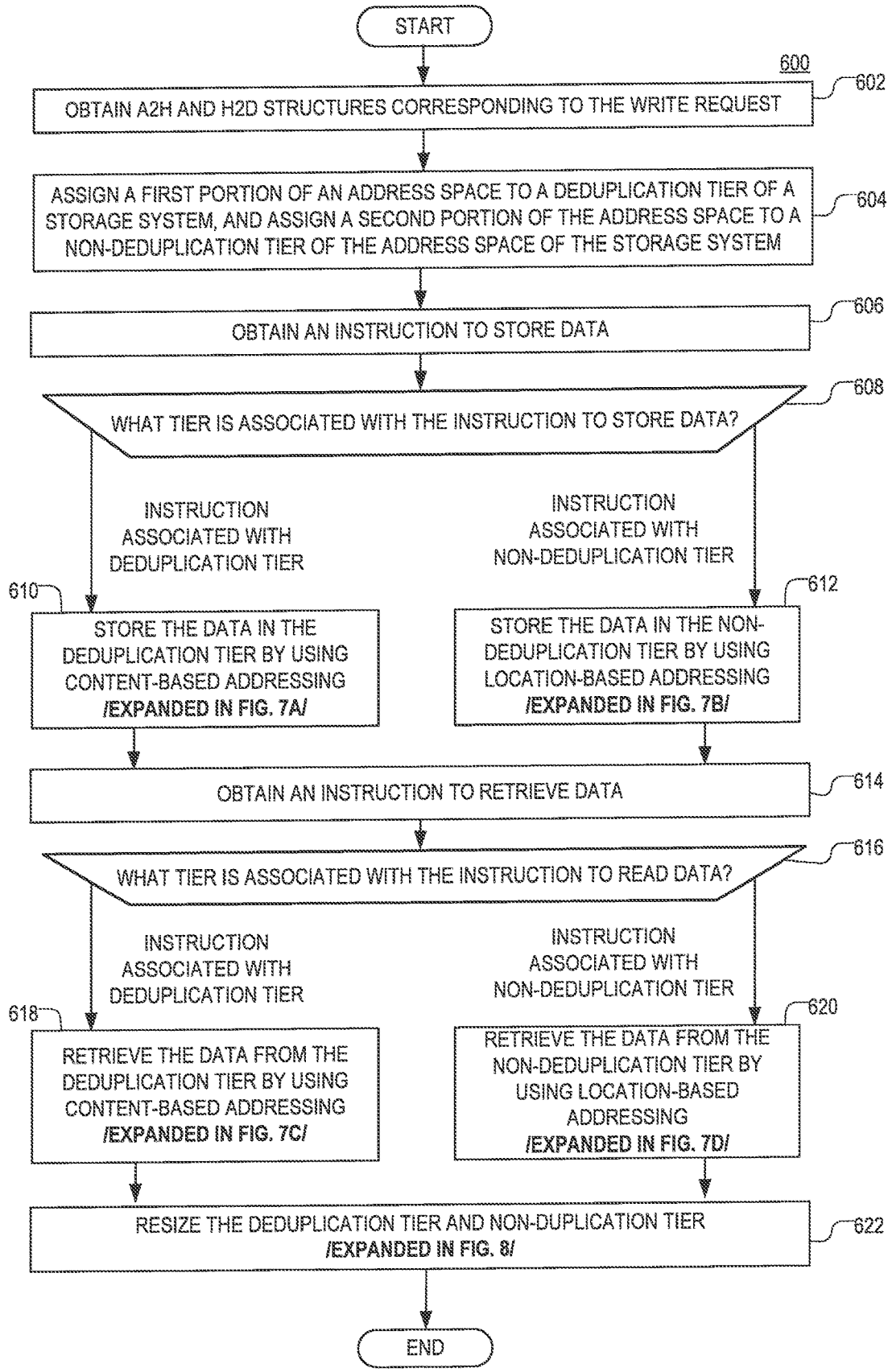
FIG. 6 is a flowchart of an example of a process, according to aspects of the disclosure.

FIG. 6 is a flowchart of an example of a process 600 for storing data in a storage system, according to aspects of the disclosure. The storage system may be the same or similar to the storage system 100, which is discussed above with respect to FIG. 1. The process 600 may be performed by a C-node in the storage system and/or any other suitable node (e.g., a computing device or a process executed on the computing device) of the storage system.

At step 602, an A2H and H2D structures are identified that are associated with an address space of a volume in the storage system. The H2D structure may be the same or similar to the H2D structure 450, which is discussed above with respect to FIG. 5C. The H2D structure may be stored in the memory of the node executing the process 700A and/or any other node in the storage system. The A2H structure may be the same or similar to the A2H structure 460, which is discussed above with respect to FIG. 4E. The A2H structure may be stored in the memory of the node executing the process 700A and/or any other node in the storage system.

At step 604, a first portion of an address space is assigned to a deduplication tier of the storage system and a second portion of the address space is assigned to a non-deduplication tier of the storage system. In some implementations, the deduplication tier of the storage system may be the same or similar to the deduplication tier 514, Which is discussed above with respect to FIG. 5A. Additionally or alternatively, in some implementations, the non-deduplication tier of the storage system may be the same or similar to the non-deduplication tier 516, which is discussed above with respect to FIG. 5A. Additionally or alternatively, in some implementations, the address space may belong to a volume in the storage system. Additionally or alternatively, assigning the first and second portions of the address space to the deduplication and non-deduplication tiers of the storage system may include populating an A2H table to include a plurality of entries that correspond to different regions in the non-deduplication tier. Each of the entries may be the same or similar to the entries 534, which are discussed above with respect to FIG. 4. As such, each of the entries may map a hash digest of an LBA corresponding to one of the regions in the non-deduplication tier 516 where data is stored to the physical location where one or more units of data are stored.

At step 606, an instruction to store data is obtained (e.g., received). In some implementations, the instruction to store data may include a write request that is received at the storage system from a host (e.g., a SCSI) command, etc.) Additionally or alternatively, in some implementations, the instruction to store data may include a command (e.g., a c-node command) that is generated internally within the storage system based on a write request that is received at the storage system from a host. In the latter case, the instruction may be generated by the node executing the process 600 or another node in the storage system. In some implementations, the command to store data may identify data and at least one LEA where the data is requested to be stored.

At step 608, a determination is made if the instruction to store data is associated with the deduplication or non-deduplication tier. When the LEA associated with the write request belongs in the deduplication tier, the instruction to store data is deemed associated with the deduplication tier and the process 600 proceeds to step 610. Otherwise, when the LEA associated with the write request belongs in the non-deduplication tier, the instruction to store data is deemed associated with the non-deduplication tier and the process 600 proceeds to step 612. In some implementations, the determination may be made by performing a search of the A2H structure based on the LBA associated with the write request. If the search returns an entry corresponding to a region in the non-deduplication tier (e.g., an entry 534), the instruction may be deemed associated with the non-deduplication tier. Otherwise, if the search fails to return a result or returns an entry associated with the deduplication tier (e.g., an entry 532), the instruction may be deemed associated with the deduplication tier.

At step 610, the instruction to store data is executed using content-based addressing. Step 608 is discussed in further detail with respect to FIG. 7A.

At step 612, the instruction to store data is executed using location-based addressing. Step 610 is discussed in further detail with respect to FIG. 7B.

At step 614, an instruction to read data is obtained (e.g., received). In some implementations, the instruction may include a read request that is received at the storage system from a host (e.g., a SCSI) command, etc.). Additionally or alternatively, in some implementations, the instruction to read data may include a command (e.g., a c-node command) that is generated internally within the storage system based on a read request received at the storage system from a host. In the latter case, the instruction may be generated by the node executing the process 600 or another node in the storage system. In some implementations, the instruction may identify at least one LBA where data is requested to be retrieved from.

At step 616, a determination is made if the instruction to read data is associated with the deduplication or non-deduplication tier. When the LBA associated with the instructions belongs in the deduplication tier, the instruction is deemed associated with the deduplication tier and the process 600 proceeds to step 618. Otherwise, when the LBA associated with the instruction belongs in the non-deduplication tier, the instruction is deemed associated with the non-deduplication tier and the process 600 proceeds to step 620. In some implementations, the determination may be made by performing a search of the A2H structure based on the LBA associated with the instruction. If the search returns an entry corresponding to a region in the non-deduplication tier (e.g., an entry 534), the instruction may be deemed associated with the non-deduplication tier. Otherwise, if the search returns an entry associated with the deduplication tier (e.g., an entry 532), the instruction may be deemed associated with the deduplication tier.

At step 618, the instruction to read data is executed using content-based addressing. Step 618 is discussed in further detail with respect to FIG. 7C.

At step 620, the instruction to read data is executed using location-based addressing. Step 620 is discussed in further detail with respect to FIG. 7D.

At step 622, the deduplication tier and the non-deduplication tier are resized. Resizing the tiers includes assigning a portion of one of the tiers to the other. The manner in which the resizing is performed is further discussed with respect to FIG. 8.

Figure 7B:
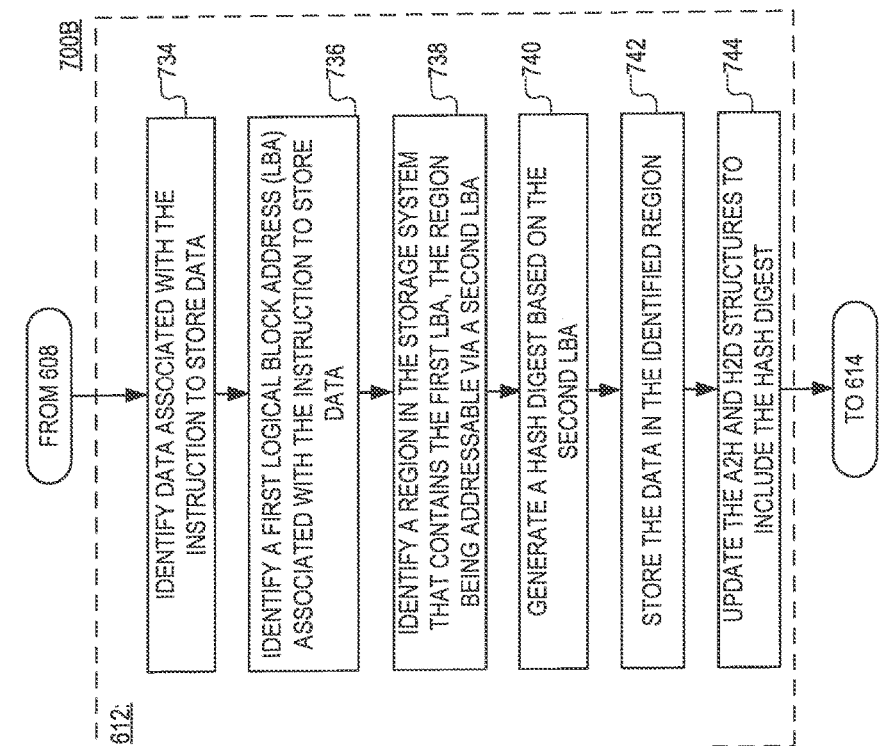
FIG. 7B is a flowchart of an example of a sub-process associated with the process of FIG. 6, according to aspects of the disclosure.
Figure 7A:
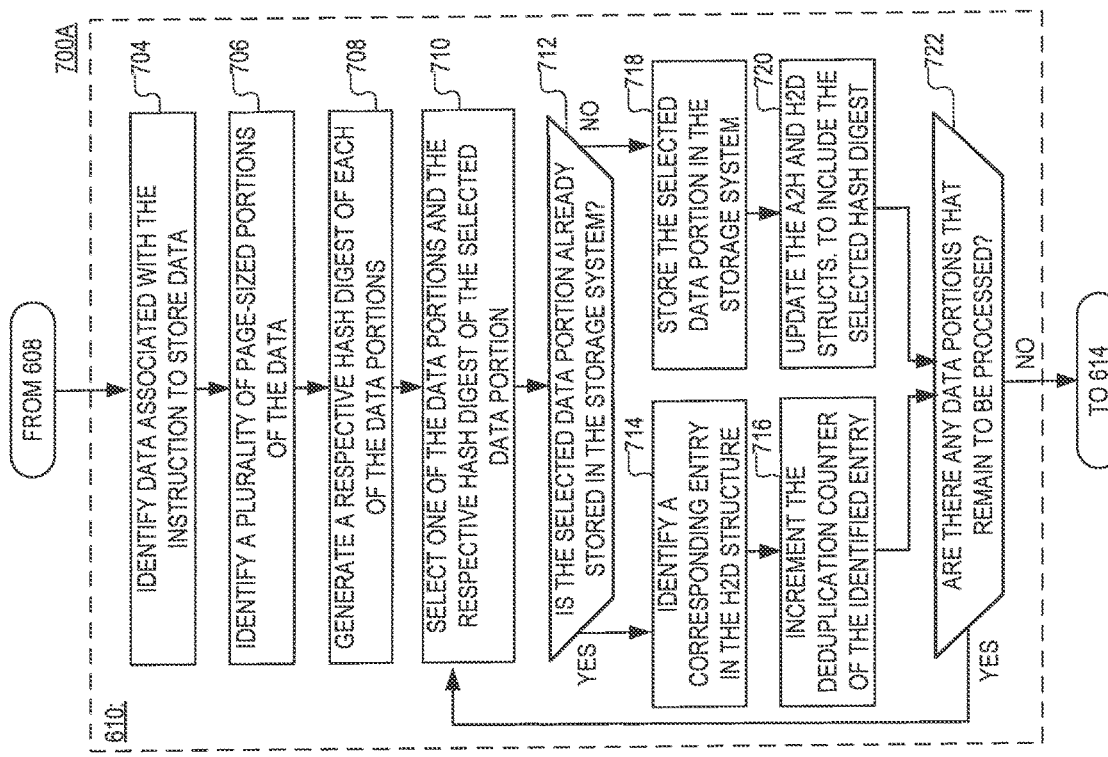
FIG. 7A is a flowchart of an example of a sub-process associated with the process of FIG. 6, according to aspects of the disclosure.

FIG. 7A is a flowchart of an example of a process 700A for storing data in the deduplication tier of a storage system, as specified by step 610 of the process 600.

At step 704, the data associated with the instruction to store data is identified. The identified data may include data whose storage is requested by the instruction. In some implementations, identifying the data may include loading the data at a predetermined memory location.

At step 706, one or more portions of the data are identified. According to the present example, each portion is the same size as a block (or page) in the storage system. However, alternative implementations are possible in which the size of each portion is equal to the size of another data unit that is utilized in the storage system.

At step 708, a plurality of hash digests is generated. Each of the hash digests in the plurality is generated based on a different one of the data portions. Each of the hash digests may be the same or similar to the hash digests 538a, which are discussed above with respect to FIG. 5C.

At step 710, one of the data portions is selected along with the hash digest that is generated based on the data portion.

At step 712, a determination is made if the selected data portion has already been stored in the storage system. In some implementations, determining whether the selected data portion has already been stored in the storage system may include, at least in part, detecting whether the selected hash digest (of the selected data portion) is present in the H2D structure. If the selected data portion has already been stored in the storage system, the process 700A proceeds to step 714. Otherwise, if the selected data portion has not been stored in the storage system, the process 700A proceeds to step 718.

At step 714, an entry in the H2D structure is identified that contains the selected hash digest. The identified entry may be the same or similar to any of the entries 532, which are discussed above with respect to FIG. 5C. The identified entry may include the hash digest, a deduplication counter corresponding to the hash digest, and a physical address identifier.

At step 716, the deduplication counter of the identified entry is incremented. The deduplication counter may be the same or similar to any of the deduplication counters 536, which are discussed above with respect to FIG. 5C.

At step 718, the selected data portion is stored in the deduplication tier of the storage system by using content-based addressing. In some implementations, storing the selected data portion in the storage system may include generating a D-node command including the selected data portion and forwarding the D-node command to a D-node in the storage system. Additionally or alternatively, in some implementations, storing the selected data portion in the storage system may include generating a command for a storage device (e.g., an SSD drive) in the storage system, and providing the command directly to the storage device. Stated succinctly, the present disclosure is not limited to any specific method for storing the selected data portion.

At step 720, the A2H and H2D structures are updated to include the selected hash digest. In some implementations, updating the H2D structure may include generating a first new entry that includes the selected hash digest and adding the first new entry to the H2D structure. In some implementations, the first new entry may be the same or similar to any of the entries 532, which are discussed above with respect to FIG. 5C. In some implementations, updating the A2H structure may include generating a second new entry and adding the second new entry to the A2H structure. In some implementations, the second new entry may be the same or similar to any of the entries 552, which are discussed above with respect to FIG. 5E.

At step 722, a determination is made if there any data portions that remain to be processed. If there are remaining data portions, the process 710A returns to step 710, and steps 710-720 are repeated for another portion. Otherwise, if there are no more data portions that remain to be processed, the process 700A proceeds to step 612.

FIG. 7B is a flowchart of an example of a process 700B for storing data in the non-deduplication tier of a storage system, as specified by step 612 of the process 600.

At step 734, the data associated with the instruction to store data is identified. The identified data may include data whose storage is requested by the instruction. In some implementations, identifying the data may include loading the data at a predetermined memory location.

At step 736, an LBA associated with the instruction to store data is identified. In some implementations, the LBA may be contained in the instruction to store data and it may identify a location in the storage system where the data associated with the instruction is desired to be stored.

At step 738, a region in the non-deduplication tier of the storage system is identified that is associated with the write request. As noted above, each region in the non-deduplication tier may include multiple logical blocks, with each logical block having a different respective LBA. In this regard, a region may be associated with the write request, when the region includes a logical block having the LBA associated with the write request. The identified region may be addressed using a second LBA. The second LBA may be the starting (e.g., smallest) LBA in the region.

At step 740, a hash digest is generated of the second LBA. In some implementations, the hash digest may be the same or similar to the hash digest 538*b*, which is discussed above with respect to FIG. 5C. As noted above, in some implementations, the hash digest of the second LBA may have the same format as the data hash digests generated at step 708.

At step 742, the data associated with write request is stored in the non-deduplication tier of the storage system by using location-based addressing. In some implementations, storing the data in the-non-deduplication tier of the storage system may include generating a command to store the data and providing the command directly to a storage device (e.g., an SSD drive) in the storage system. In some implementations, storing the data in the-non-deduplication tier of the storage system may include generating a command to store the data and providing the command directly to another node (e.g., a D-node) in the storage system. Stated succinctly, the present disclosure is not limited to any specific method for storing the data.

At step 744, the A2H and H2D structures are updated to include the generated hash digest of the LBA. In some implementations, updating the H2D structure may include generating a first new entry that includes the generated hash digest of the LBA, and adding the first new entry to the H2D structure. In some implementations, the first new entry may be the same or similar to any of the entries 534, which are discussed above with respect to FIG. 5C. In some implementations, updating the A2H structure may include generating a second new entry that includes the hash digest of the LBA of the region in the non-deduplication tier where the data is stored, and adding the second new entry to the A2H structure. In some implementations, the second new entry may be the same or similar to any of the entries 554, which are discussed above with respect to FIG. 5E. According to the present example, the generated new entries identify the starting LBA of a region in the non-deduplication tier where data is stored, which may different from the actual location, within the region, where the data is stored. However, it will be understood, that the offset between the actual location where the data is stored and the starting location of the region can be readily resolved when subsequent read requests are received based on LBAs provided with the requests.

Figure 7D:
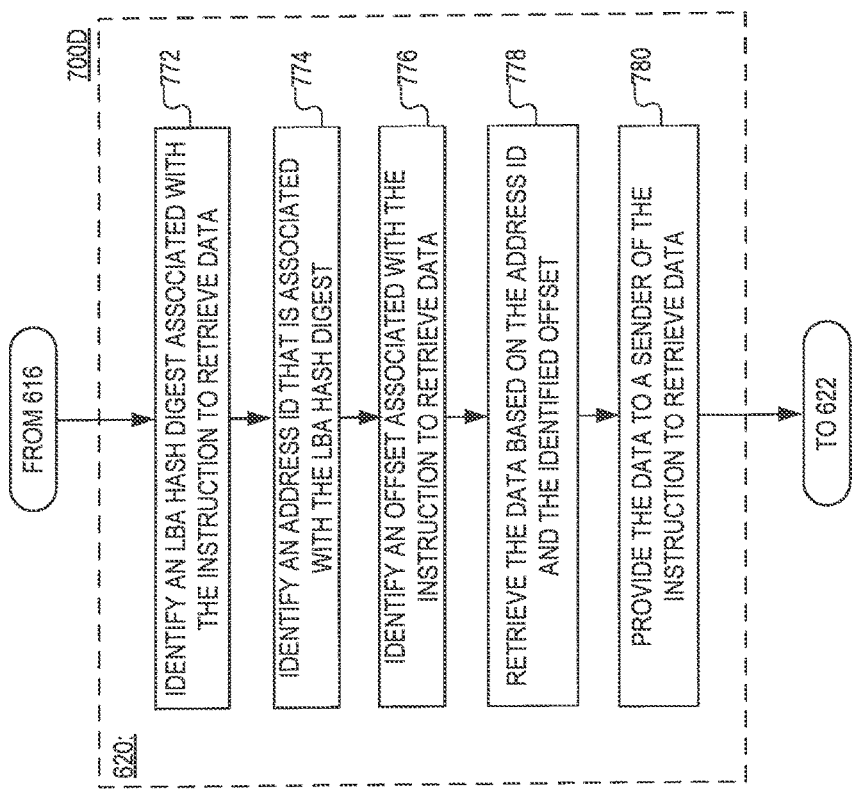
FIG. 7D is a flowchart of an example of a sub-process associated with the process of FIG. 6, according to aspects of the disclosure.
Figure 7C:
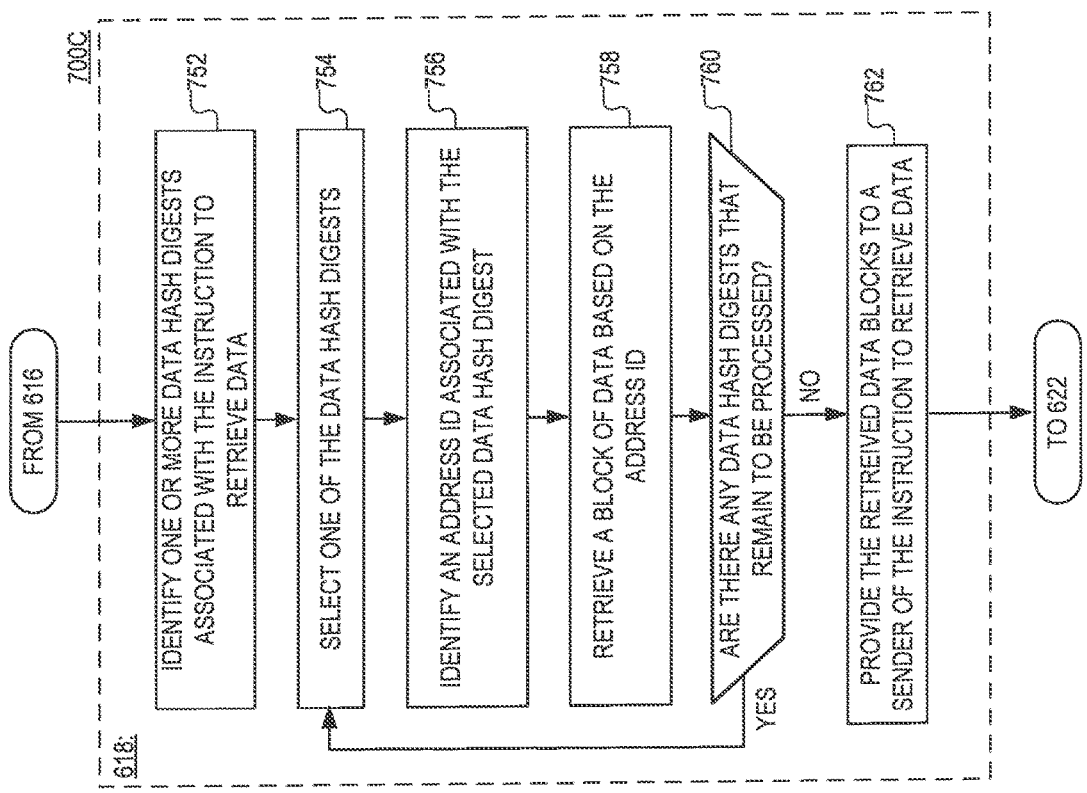
FIG. 7C is flowchart of an example of a sub-process associated with the process of FIG. 6, according to aspects of the disclosure.

FIG. 7C is a flowchart of an example of a process 700C for reading data from the deduplication tier of a storage system, as specified by step 618 of the process 600.

At step 752, one or more data hash digests associated with the instruction to read data are identified. Each of the data hash digests may correspond to a different logical block of the data. Each of the data hash digests may be retrieved from the A2H structure by performing a search of the A2H structure. The search may be performed based on the LBA identified by the instruction.

At step 754, one of the identified data hash digests is selected.

At step 756, an address ID associated with the data hash digest is obtained. The address ID may be the same or similar to any of the address IDs 540, which are discussed above with respect to FIG. 5C. The address ID may be obtained from the H2D structure as a result of performing a search of the H2D structure. The search may be performed by using the selected data hash digest as a key.

At step 758, the logical block of data corresponding to the selected data hash digest is retrieved from the deduplication tier of the storage system. The logical block is retrieved based on the obtained address ID. In implementations in which the process 700C is executed by a C-node in the storage system, retrieving the logical block of data may include transmitting a D-node command to one of the D-nodes in the storage system and receiving the logical block in response.

At step 760, a determination is made if any of the data hash digests identified at step 752 remain to be processed. If there are data hash digests that remain to be processed, the process 700C returns to step 754. Otherwise, if there are no more data hash digests that remain to be processed, the process 700C proceeds to step 762.

At step 762, all logical blocks that are retrieved at step 758 are returned to the sender of the read instruction. For example, in implementations in which the process 700C is executed by a C-node in the storage system and the instruction to read data is provided by an R-node, the logical blocks of data may be provided to the R-node.

FIG. 7D is a flowchart of an example of a process 700D for reading data from the non-deduplication tier of a storage system, as specified by step 620 of the process 600.

At step 772, an LBA hash digest associated with the instruction to read data is identified. The LBA hash digest may be the same or similar to any of the LBA hash digests 538b, which are discussed above with respect to FIG. 5E. The LBA hash digest may correspond to the region where the data requested by the instruction is stored. The LBA hash digest can be identified by performing a search of the A2H structure. The search may be performed by using the LBA identified by the instruction as a key. The LBA hash digest (which is retrieved a result of the search) may encode an LBA associated with the region where the data is stored. As discussed above, in some implementations, the LBA identified by the instruction may point to a location inside the region, whereas the LBA associated with the region may point to the beginning of the region.

At step 774, an address ID associated with the LBA hash digest is obtained. The address ID may be the same or similar to any of the address IDs 540, which are discussed above with respect to FIG. 5C. The address ID may be obtained from the H2D structure as a result of performing a search of the H2D structure. The search may be performed by using the LBA hash digest as a key.

At step 776, an offset within the region is determined. In some implementations, the offset may be calculated based on the difference between the LBA associated with the region and the LBA identified by the instruction to read data. As can be readily appreciated, the offset may identify the location within the region where the requested data is stored.

At step 778, the requested data is retrieved from the non-deduplication tier based on the address ID and offset. When the process 700C is executed by a C-node in the storage system, retrieving the data may include transmitting a D-node command to one of the D-nodes in the storage system and receiving the data in response.

At step 780, the retrieved data is returned to the sender of the read request. For example, in implementations in which the process 700D is executed by a C-node in the storage system and the request to read data is provided by an R-node, the data blocks may be provided to the R-node.

Figure 8:
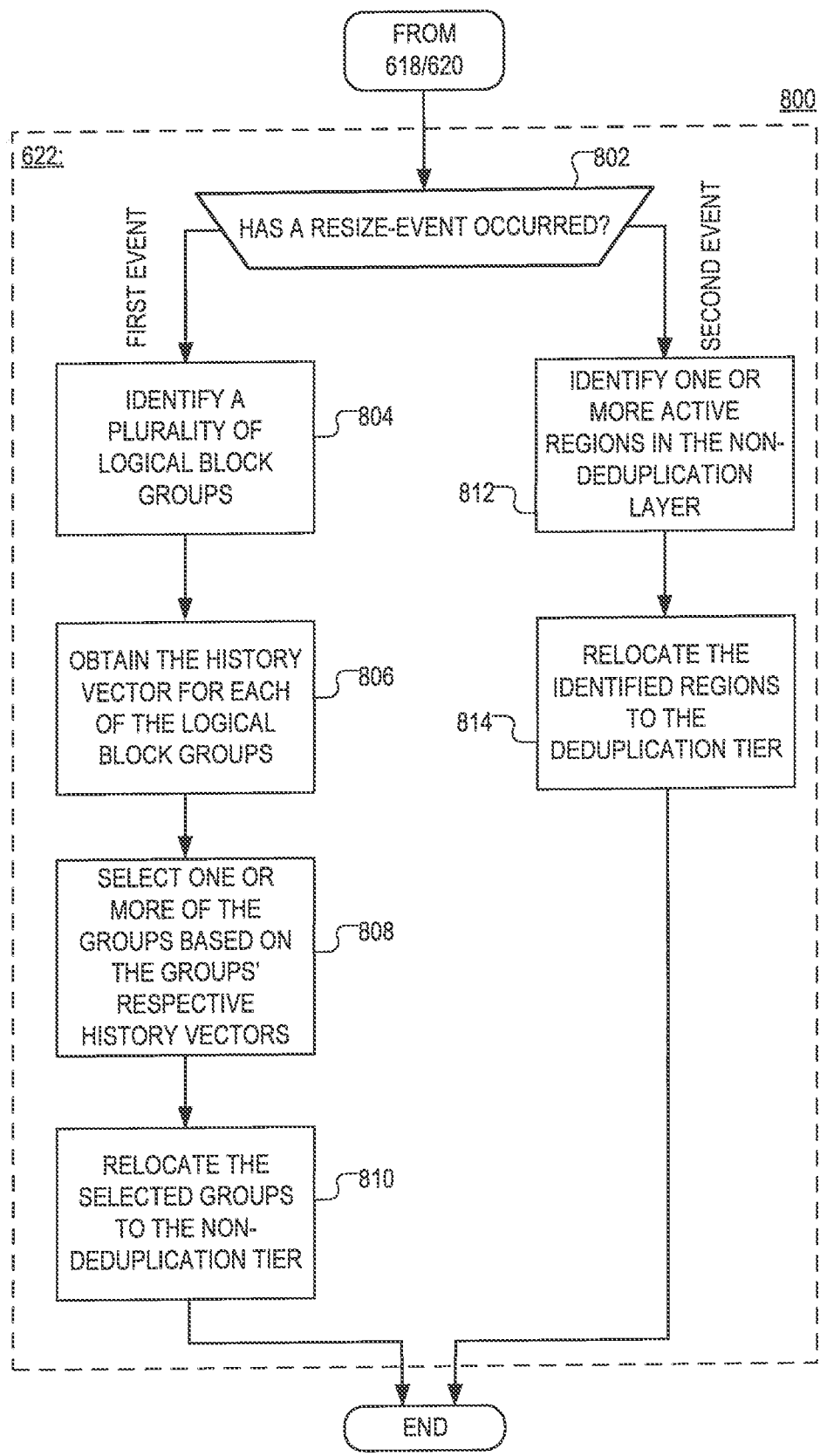
FIG. 8 is a flowchart of an example of a sub-process associated with the process of FIG. 6, according to aspects of the disclosure.

FIG. 8 is a flowchart of an example of a process 800 for resizing the non-deduplication and deduplication tiers of the storage system as specified by step 622 of the process 600. As is discussed further below, the resizing may result in a portion of the non-deduplication tier being assigned to the deduplication tier, in which the case the size of the non-deduplication tier of the storage system is reduced and the size of the deduplication tier is increased. Alternatively, the resizing may result in a portion of the deduplication tier being assigned to the non-deduplication tier, in which case the size of the deduplication tier is reduced and the size of the non-deduplication tier is increased.

At step 802, a determination is made whether one of a first event and a second event has been generated within the storage system. In some implementations, the first event may occur when the amount of random-access memory that is available to one or more nodes in the storage system falls below a threshold. In some implementations, the second event may occur when the utilization rate of one or more regions in the non-deduplication tier of the storage system exceeds a threshold. Additionally or alternatively, in some implementations, the first event and/or the second event may occur when a timer associated with the first event and/or the second event expires. In the latter case, the first event and the second event may be generated periodically within the storage system (as opposed to being generated dynamically based on utilization rate and/or memory usage).

At step 804, a plurality of logical blocks groups is identified. Each of the logical block groups may have a combined size that equals the size of the regions in the non-deduplication layer. Each of the logical block groups may be the same or similar to the logical block groups discussed with respect to FIG. 5F.

At step 806, a respective history vector is obtained for each of the identified logical block groups. In some implementations, the respective history vectors may be obtained from a data structure, such as the history data structure 560, which is discussed with respect to FIG. 5F. Each respective history vector may be the same or similar to the history vectors 564, which are discussed above with respect to FIG. 5F.

At step 808 one or more groups are selected based on the groups' respective history vectors. In some implementations, the selected logical block groups may include logical groups whose respective indication of CDR is above a predetermined threshold. Additionally or alternatively, the selected logical block groups may be selected whose deduplication ratio increases at a rate exceeding a predetermined threshold over the period covered by the groups' respective history vectors. Additionally or alternatively, the selected one or more groups may include groups whose average deduplication ratio (as calculated based on the indications of CCDR and PDR in the groups' respective history vectors) exceed a predetermined threshold. Additionally or alternatively, in some implementations, the selected logical block groups may include N logical block groups that have the highest CCDR among all identified logical block groups, wherein N is an integer greater than or equal to 1 and less than the total number of logical block groups. Additionally or alternatively, in some implementations, the selected logical block groups may include N logical block groups whose respective deduplication ratios increase at the fastest rate among all identified logical block groups, Wherein N is an integer greater than or equal to 1 and less than the total number of logical block groups. Additionally or alternatively, in some implementations, the selected logical block groups may include N logical block groups that have the highest average deduplication ratios among all identified logical block groups, wherein N is an integer greater than or equal to 1 and less than the total number of logical block groups. Stated succinctly the present disclosure is not limited to any specific criterion for selecting a logical block group based on at least one of: (i) the history vector of the logical block group, or (ii) the history vectors of one or more other logical block groups that are associated with the deduplication tier of the same address space.

At step 810, the selected logical block groups are relocated from the deduplication tier to the non-deduplication tier of the storage system. As noted above, each logical block group may have the same size as the regions in the non-deduplication tier. Relocating any of the logical block groups may include deleting form each of the A2H and H2D structures a plurality of entries that correspond to individual logical blocks in the group (e.g., entries 532/552) and replacing each of the deleted pluralities of entries with an individual entry (e.g., an entry 523/554) that corresponds to the entire group—i.e., an entry that corresponds to the region that is formed by the group.

More particularly, when a group of logical blocks is relocated, a plurality of entries corresponding to individual logical blocks in the group (e.g., entries 532) may be deleted from the H2D structure and replaced with a single entry (e.g., an entry 534) that corresponds to the entire group of logical blocks, and which can be used to addressed the group of logical blocks as a region. Additionally or alternatively, when a group of logical blocks is relocated, a plurality of entries corresponding to individual logical blocks in the group (e.g., entries 552) may be deleted from the A2H structure and replaced with a single entry (e.g., an entry 554) that corresponds to the entire group of logical blocks, and which can be used to addressed the group of logical blocks as a region.

At step 812, one or more regions are selected based on the regions' respective utilization rates. The utilization rate of any one of the regions may be based on the count of writes performed in the region, a count of reads performed in the region, a total amount of data stored in the region during a particular period, a total amount of data retrieved from the region, and/or any other suitable metric that at least in part indicates the degree to Which the region is utilized. In some implementations, the selected one or more regions may include regions whose respective utilization rates exceed a fixed threshold. Additionally or alternatively, the selected regions may include N regions that have the highest utilization rate among a plurality of regions (e.g., all regions) in the non-deduplication tier of the storage system, where N is an integer greater than or equal to 1 and less than the total number of regions in the plurality.

At step 814, the selected regions are relocated from the non-deduplication tier of the storage system to the deduplication tier of the storage system. Relocating any of the selected regions may include deleting from the A2H and H2D structures respective entries (e.g., entries 534 and 544 that correspond to the region and replacing each of the deleted entries with a respective plurality of entries that correspond to individual blocks in the region. As discussed above, when data is relocated from the non-deduplication tier to the deduplication tier, the data may be deduplicated, which may result in a reduction in the amount of storage space that is used to hold the data.

More particularly, when a region is relocated, a single entry corresponding to the entire region (e.g., an entry 534) may be deleted from the H2D structure and replaced with a plurality of entries (e.g., an entry 532), wherein each of the plurality of entries corresponds to a different logical block in the region. Additionally or alternatively, when a region is relocated, a single entry corresponding to the entire region (e.g., an entry 554) may be deleted from the A2H structure and replaced with a plurality of entries (e.g., an entry 532), wherein each of the plurality of entries corresponds to a different logical block in the region.

FIGS. 1-8 are provided as an example only. According to the example of the process 600, different portions of the address space are assigned to the deduplication and non-deduplication tier when the process 600 begins being executed. However, alternative implementations are possible in which the entire address space assigned to deduplication tier at first, and then portions of the deduplication tier are gradually moved to the non-deduplication tier when the amount of RAM that is available to one or more nodes in the storage system 100 decreases.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for storing data in a storage system, comprising:
receiving a write request at the storage system, the write request requesting the storage system to store the data at a first logical block address (LBA);
detecting whether the write request is associated with one of a deduplication tier or a non-deduplication tier of the storage system, the deduplication tier of the storage system including a first portion of a volume in the storage system, and the non-deduplication tier including a second portion of the volume;
when the write request is associated with the deduplication tier of the storage system, storing data associated with the write request in the first portion of the volume and updating an address-to-hash (A2H) structure to map the first LBA to at least one first hash digest that is generated based on the data; and
when the write request is associated with the non-deduplication tier of the storage system, storing data associated with the write request in the second portion of the volume and updating the A2H structure to map the first LBA to a second hash digest that is generated based on a second LBA, the second LBA identifying a first region in the second portion of the storage system where the data is stored,
wherein and the A2H structure is used by the storage system to resolve read requests that are directed to either one of the deduplication tier and the non-deduplication tier of the storage system.

2. The method of claim 1, wherein the first hash digest and the second hash digest have the same format.

3. The method of claim 1, further comprising:
updating a hash-to-data (H2D) structure to map the first hash digest to a physical address in a storage device where the data is stored, when the write request is associated with the deduplication tier of the storage system; and
updating the H2D structure to map the second hash digest to a physical address in a storage device where the data is stored, when the write request is associated with the non-deduplication tier of the storage system.

4. The method of claim 1, further comprising:
identifying a second region in the non-deduplication tier of the storage system, the second region having a respective utilization rate that exceeds a predetermined threshold, and
relocating the identified second region from the non-deduplication tier of the storage system to the deduplication tier of the storage system.

5. The method of claim 1, further comprising:
detecting that an amount of available random-access memory (RAM) has fallen below a threshold; and
freeing a portion of the RAM by relocating a group of pages from the deduplication tier of the storage system to the non-deduplication tier, the relocating including deleting one or more entries from a second structure that is stored in the RAM, each of the entries mapping a hash digest of one of the pages to a physical address in the storage system where the page is stored.

6. The method of claim 5, further comprising selecting the group of pages for relocation to the non-deduplication tier of the storage system, wherein each of the pages in the group is relocated based on a respective history vector that identifies an extent to which the page is deduplicated.

7. A storage system, comprising:
a memory; and
one or more processors operatively coupled to the memory, the one or more processors being configured to perform the operations of:
receiving a write request at the storage system, the write request requesting the storage system to store data at a first logical block address (LBA);

detecting whether the write request is associated with one of a deduplication tier or a non-deduplication tier of the storage system, the deduplication tier of the storage system including a first portion of a volume in the storage system, and the non-deduplication tier including a second portion of the volume;

when the write request is associated with the deduplication tier of the storage system, storing data associated with the write request in the first portion of the volume and updating an address-to-hash (A2H) structure to map the first LBA to at least one first hash digest that is generated based on the data; and when the write request is associated with the non-deduplication tier of the storage system, storing data associated with the write request in the second portion of the volume and updating the A2H structure to map the first LBA to a second hash digest that is generated based on a second LBA, the second LBA identifying a first region in the second portion of the storage system where the data is stored, wherein the A2H structure is used by the storage system to resolve read requests that are directed to either one of the deduplication tier and the non-deduplication tier of the storage system.

8. The storage system of claim 7, wherein the first hash digest and the second hash digest have the same format.

9. The storage system of claim 7, wherein the one or more processors are further configured to perform the operations of:

updating a hash-to-data (H2D) structure to map the first hash digest to a physical address in a storage device where the data is stored, when the write request is associated with the deduplication tier of the storage system; and updating the H2D structure to map the second hash digest to a physical address in a storage device where the data is stored, when the write request is associated with the non-deduplication tier of the storage system.

10. The storage system of claim 7, wherein the one or more processors are further configured to perform the operations of:

identifying a second region in the non-deduplication tier of the storage system, the second region having a respective utilization rate that exceeds a predetermined threshold, and relocating the identified second region from the non-deduplication tier of the storage system to the deduplication tier of the storage system.

11. The storage system of claim 7, wherein the one or more processors are further configured to perform the operations of:

detecting that an amount of available random-access memory (RAM) has fallen below a threshold; and freeing a portion of the RAM by relocating a group of pages from the deduplication tier of the storage system to the non-deduplication tier, the relocating including deleting one or more entries from a second structure that is stored in the RAM, each of the entries mapping a hash digest of one of the pages to a physical address in the storage system where the page is stored.

12. The storage system of claim 11, wherein the one or more processors are further configured to perform the operation of selecting the group of pages for relocation to the non-deduplication tier of the storage system, wherein each of the pages in the group is relocated based on a respective history vector that identifies an extent to which the page is deduplicated.

13. A non-transitory computer-readable medium configured to store one or more processor-executable instructions, which when executed by one or more processors, cause the processors to perform the operations of:

receiving a write request at a storage system, the write request requesting the storage system to store data at a first logical block address (LBA);

detecting whether the write request is associated with one of a deduplication tier or a non-deduplication tier of the storage system, the deduplication tier of the storage system including a first portion of a volume in the storage system, and the non-deduplication tier including a second portion of the volume;

when the write request is associated with the deduplication tier of the storage system, storing data associated with the write request in the first portion of the volume and updating an address-to-hash (A2H) structure to map the first LBA to at least one first hash digest that is generated based on the data; and when the write request is associated with the non-deduplication tier of the storage system, storing data associated with the write request in the second portion of the volume and updating the A2H structure to map the first LBA to a second hash digest that is generated based on a second LBA, the second LBA identifying a first region in the second portion of the storage system where the data is stored, wherein the A2H structure is used by the storage system to resolve read requests that are directed to either one of the deduplication tier and the non-deduplication tier of the storage system.

14. The non-transitory computer-readable medium of claim 13, wherein the first hash digest and the second hash digest have the same format.

15. The non-transitory computer-readable medium of claim 13, wherein the one or more processor instructions, when executed by the one or more processors, further cause the one or more processors to perform the operations of:

updating a hash-to-data (H2D) structure to map the first hash digest to a physical address in a storage device where the data is stored, when the write request is associated with the deduplication tier of the storage system; and updating the H2D structure to map the second hash digest to a physical address in a storage device where the data is stored, when the write request is associated with the non-deduplication tier of the storage system.

16. The non-transitory computer-readable medium of claim 13, wherein the one or more processor instructions, when executed by the one or more processors, further cause the one or more processors to perform the operations of:

identifying a second region in the non-deduplication tier of the storage system, the second region having a respective utilization rate that exceeds a predetermined threshold, and relocating the identified second region from the non-deduplication tier of the storage system to the deduplication tier of the storage system.

17. The non-transitory computer-readable medium of claim 13, wherein the one or more processor instructions, when executed by the one or more processors, further cause the one or more processors to perform the operations of:

detecting that an amount of available random-access memory (RAM) has fallen below a threshold; and freeing a portion of the RAM by relocating a group of pages from the deduplication tier of the storage system to the non-deduplication tier, the relocating including deleting one or more entries from a second structure that is stored in the RAM, each of the entries mapping a hash digest of one of the pages to a physical address in the storage system where the page is stored.

\* \* \* \* \*